(12) United States Patent
Spinella et al.

(10) Patent No.: US 12,365,045 B2
(45) Date of Patent: Jul. 22, 2025

(54) ELECTRODES FOR RESISTANCE WELDING AND METHOD OF USE THEREOF

(71) Applicant: Howmet Aerospace Inc., Pittsburgh, PA (US)

(72) Inventors: Donald J. Spinella, Greensburg, PA (US); Anthony J. Fedusa, Lower Burrell, PA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 802 days.

(21) Appl. No.: 17/479,816

(22) Filed: Sep. 20, 2021

(65) Prior Publication Data

US 2022/0088698 A1   Mar. 24, 2022

Related U.S. Application Data

(60) Provisional application No. 63/080,871, filed on Sep. 21, 2020.

(51) Int. Cl.
*B23K 11/11* (2006.01)

(52) U.S. Cl.
CPC ..................................... *B23K 11/11* (2013.01)

(58) Field of Classification Search
CPC . B23K 11/11; B23K 11/3009; B23K 35/0205; B23K 35/222; B23K 11/0066; B21J 15/02; B21J 15/08; B21J 15/36
See application file for complete search history.

(56) References Cited

U.S. PATENT DOCUMENTS

| | | | | |
|---|---|---|---|---|
| 3,909,581 | A | * | 9/1975 | Stone ................. B23K 11/3018 219/119 |
| 4,122,988 | A | | 10/1978 | Casutt |
| 4,514,612 | A | * | 4/1985 | Nied .................. B23K 11/3009 219/86.25 |

(Continued)

FOREIGN PATENT DOCUMENTS

| | | |
|---|---|---|
| CN | 2873359 Y | 2/2007 |
| JP | 9-24437 A | 1/1997 |

(Continued)

OTHER PUBLICATIONS https://www.engineersedge.com/properties_of_metals.htm (Year: 2001).*

(Continued)

*Primary Examiner* — Tiffany T Tran
(74) *Attorney, Agent, or Firm* — K&L Gates LLP

(57) ABSTRACT

A hybrid electrode for resistance spot welding and a method of resistance welding are provided. The hybrid electrode comprises a pin and a collar member. The pin comprises an electrically conductive material and a pin contact surface. The collar member comprises a material that is at least one of less electrically conductive than the electrically conductive material of the pin and less thermally conductive than the electrically conductive material of the pin. The collar member comprises a collar member contact surface, and defines an inner cavity and a longitudinal axis. The pin is at least partially disposed in the inner cavity and the pin contact surface extends away from the collar member and is offset a distance along the longitudinal axis from the collar member contact surface.

17 Claims, 8 Drawing Sheets

(56) References Cited

U.S. PATENT DOCUMENTS

| | | | |
|---|---|---|---|
| 4,947,019 A * | 8/1990 | Akiyama | B23K 11/3009 |
| | | | 219/119 |
| 2009/0266866 A1 | 10/2009 | Davies et al. | |
| 2014/0021172 A1* | 1/2014 | Sanders | H05H 1/34 |
| | | | 29/428 |
| 2014/0079494 A1 | 3/2014 | Hain et al. | |
| 2015/0217395 A1 | 8/2015 | Spinella et al. | |
| 2016/0262214 A1 | 9/2016 | Kondo et al. | |
| 2017/0072454 A1 | 3/2017 | Wilcox | |
| 2017/0316556 A1* | 11/2017 | Spinella | B23K 11/20 |
| 2017/0348788 A1* | 12/2017 | Chen | B23K 11/36 |
| 2020/0276665 A1* | 9/2020 | Murayama | B23K 11/36 |
| 2020/0361020 A1 | 11/2020 | Vanderzwet et al. | |
| 2021/0379647 A1 | 12/2021 | Cosgrave et al. | |
| 2021/0394252 A1 | 12/2021 | Vanderzwet et al. | |

FOREIGN PATENT DOCUMENTS

| | | |
|---|---|---|
| JP | 2008-229717 A | 10/2008 |
| KR | 20-0415450 Y1 | 5/2006 |
| KR | 10-2012-0108280 A | 10/2012 |
| KR | 10-2017-0057080 A | 5/2017 |
| KR | 10-1832112 B1 | 2/2018 |
| WO | 2019118659 A1 | 6/2019 |

OTHER PUBLICATIONS https://www.education.com/science-fair/article/resistivity-iron-conduct-electricity-copper, pp. 3-4 (Year: 2010).*

* cited by examiner

Female Caps

Pointed "A" Nose    Domed "B" Nose    Flat "C" Nose    Offset "D" Nose    Truncated "E" Nose    Radius "F" Nose

Male Caps

Pointed "A" Nose    Domed "B" Nose    Flat "C" Nose    Offset "D" Nose    Truncated "E" Nose    Radius "F" Nose

ELECTRODES FOR RESISTANCE WELDING AND METHOD OF USE THEREOF

CROSS REFERENCE TO RELATED APPLICATIONS

This application claims the benefit of U.S. Provisional Patent Application Ser. No. 63/080,871, filed Sep. 21, 2020, the entire contents of which are hereby incorporated herein by reference.

FIELD OF USE

The present disclosure relates to electrodes for resistance welding and resistance spot riveting, and to apparatus, systems, and methods utilizing the electrodes.

BACKGROUND

Current methods of fastening together assemblies, such as fastening together sheets of dissimilar metals or metal alloys, can include the use of, for example, rivets. These methods can require resistance spot welding of rivets to at least one of the metallic sheets. There are challenges associated with fastening together metallic structures using rivets.

SUMMARY

One non-limiting aspect according to the present disclosure is directed to a hybrid electrode adapted for resistance spot welding. The hybrid electrode comprises a pin and a collar member. The pin comprises an electrically conductive material and a pin contact surface. The collar member comprises a material having at least one of lower electrical conductivity than the electrically conductive material of the pin and lower thermal conductivity than the electrically conductive material of the pin. The collar member defines an inner cavity having a longitudinal axis and comprises a collar member contact surface. The pin is at least partially disposed in the inner cavity, and the pin contact surface extends beyond the collar member and is offset a distance along the longitudinal axis from the collar member contact surface.

A further non-limiting aspect according to the present disclosure is directed to a method of resistance spot riveting utilizing at least one electrode that is a hybrid electrode. The hybrid electrode comprises a pin and a collar member. The pin comprises an electrically conductive material and a pin contact surface. The collar member comprises a material having at least one of lower electrical conductivity than the electrically conductive material of the pin and lower thermal conductivity than the electrically conductive material of the pin. The collar member defines an inner cavity having a longitudinal axis and comprises a collar member contact surface. The pin is at least partially disposed in the inner cavity, and the pin contact surface extends beyond the collar member and is offset a distance along the longitudinal axis from the collar member contact surface.

It will be understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein.

Figure 1:
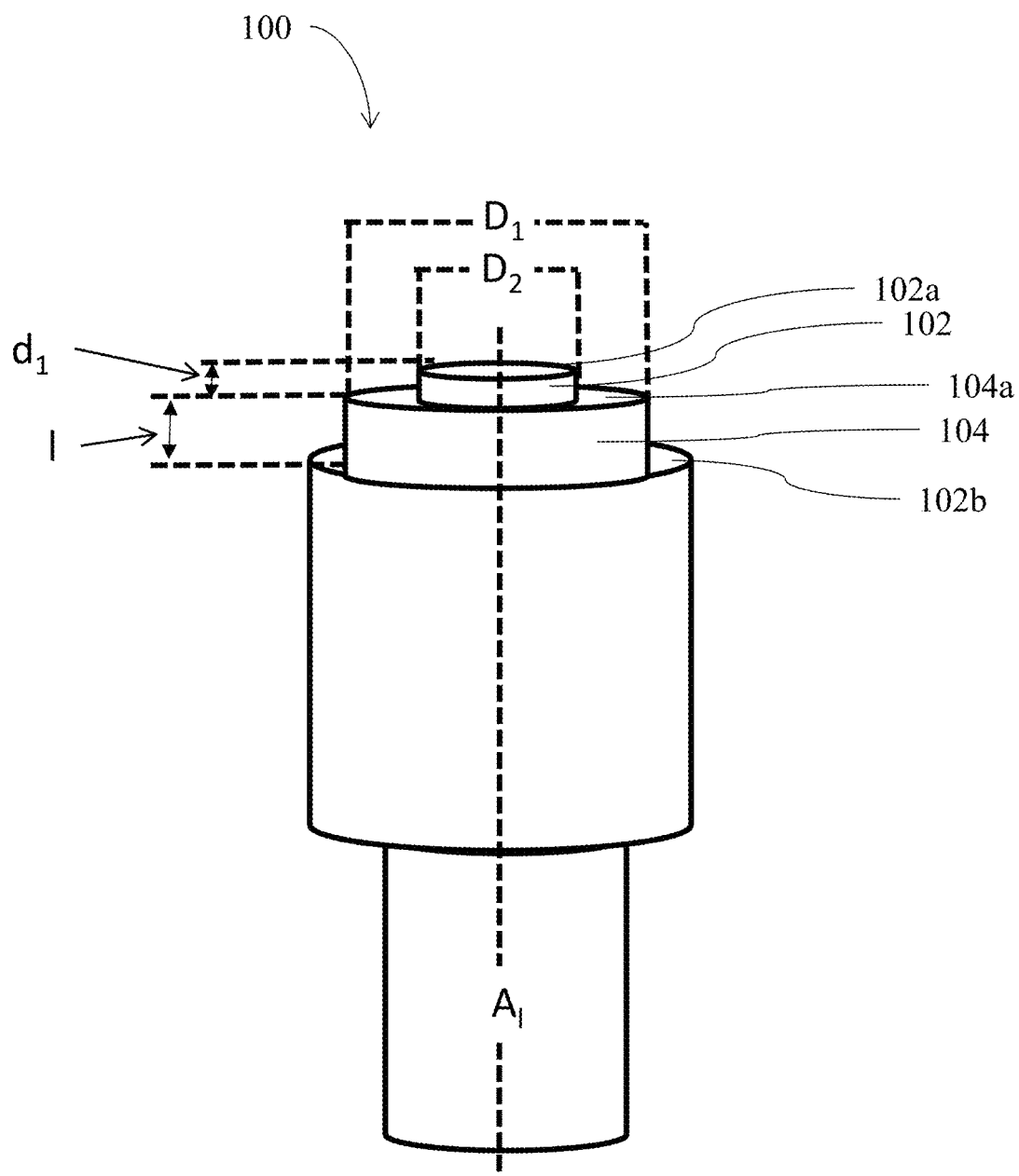
FIG. 1 is a schematic illustration showing a non-limiting embodiment of a hybrid electrode according to the present disclosure.

The exemplifications set out herein illustrate certain non-limiting embodiments, in one form, and such exemplifications are not to be construed as limiting the scope of the appended claims and the invention in any manner.

DETAILED DESCRIPTION OF NON-LIMITING EMBODIMENTS

Various examples are described and illustrated herein to provide an overall understanding of the structure, function, and use of the disclosed apparatus and methods. The various examples described and illustrated herein are non-limiting and non-exhaustive. Thus, the invention is not limited by the description of the various non-limiting and non-exhaustive examples disclosed herein. The features and characteristics illustrated and/or described in connection with various examples may be combined with the features and characteristics of other examples. Such modifications and variations are intended to be included within the scope of the present disclosure. The various non-limiting embodiments disclosed and described in the present disclosure can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same non-limiting embodiment. Furthermore, the particular described features, structures, or characteristics may be combined in any suitable manner in one or more non-limiting embodiments. Thus, the particular features, structures, or characteristics illustrated or described in connection with one non-limiting embodiment may be combined, in whole or in part, with the features, structures, or characteristics of one or more other non-limiting embodiments without limitation. Such modifications and variations are intended to be included within the scope of the present non-limiting embodiments.

In the present disclosure, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

The present inventor observed that in certain resistance heating fastening techniques such as joining aluminum to thin steels with a steel resistance spot riveting (RSR) rivet, it can be difficult to get adequate heat into the steel sheets to cause melting or fusion for welding. For example, obtaining the proper energy density at the interfaces in order to generate localized melting while balancing excessive heat in the adjacent regions can be difficult. Existing copper based electrodes and geometries may not produce the balance required to meet both weld generation and minimally heat affected zones in the steel sheets. Using higher weld currents and/or longer heating times can produce excessive heat in the aluminum sheet leading to expulsion or loss of metal and porosity. Excessive electrode penetration on the steel sheet side can lead to cracking in the steel sheet, joint deformation, and/or expulsion in the aluminum sheet. Additionally, Electrode penetration can worsen as the welding current/time is increased to create a weld.

The present inventor observed that using electrodes having a large face diameter and radius may not increase the amount of fusion in the steel sheet as these electrodes can increase the electrical contact area, thereby reducing the current density during the heating process and stunting weld development. Tighter face radius electrodes may not increase the likelihood of fusion in the steel sheet but can increase the amount of electrode penetration and joint deformation. Additionally, the process window for generating welds may be very narrow (e.g., a few hundred amperes).

In light of the issues discovered by the inventor, a hybrid electrode and method of use thereof is provided herein which can: reduce the rate of change in current density decrease during resistance heating while minimizing the amount of electrode penetration into the sheet(s); reduce the rate of electrical contact area growth between the electrode to sheet during the heating process; reduce the rate of change in the thermal resistivity between the electrode and sheet during the heating process; and restrict the degree of electrode penetration into the sheets, thereby reducing changes in the current density, electrical contact area growth, and thermal conductivity at the electrode-to-sheet interfaces during the heating process. The hybrid electrode and method of use according to the present disclosure can be compatible with existing resistance spot welding consumables (e.g., size, shape, ability to be incorporated in existing welding guns/machines) and capable of performing both conventional resistance spot welding and resistance spot riveting. Further, the hybrid electrode and method of use according to the present disclosure can improve the efficiency of the heating process, leading to welding at lower currents/energy inputs, reducing expulsion/overheating, and widening the process window.

FIG. 1 illustrates a non-limiting embodiment of a hybrid electrode 100 according to the present disclosure. The hybrid electrode 100 comprises a pin 102 and a collar member 104. The pin 102 is configured to engage an assembly and establish electrical communication between the hybrid electrode 100 and the assembly to perform a resistance spot welding operation such as, for example, a resistance spot riveting operation and/or a resistance element welding operation. In various non-limiting embodiments, the pin 102 can comprise an electrically conductive material, such as, for example, copper, a copper alloy, or other suitable material for resistance spot welding.

The collar member 104 is configured to engage the assembly during the resistance spot welding operation to limit the penetration depth of the hybrid electrode 100 into the assembly while limiting changes in electrical communication between the hybrid electrode 100 and the assembly. For example, the collar member 104 can comprise a material that is less electrically conductive (i.e., having higher resistivity) than the electrically conductive material of the pin 102 and/or is less thermally conductive than the electrically conductive material of the pin 102. For example, the collar member 104 can comprise a grade of copper that is less electrically conductive and/or less thermally conductive than the material of the pin 102. The collar member 104 also could comprise iron, an iron alloy (e.g., a steel), a ceramic or other insulating material, titanium, a titanium alloy, or a combination thereof, or any other suitable material that is less electrically conductive and/or less thermally conductive than the electrically conductive material of the pin 102. In various non-limiting embodiments, the collar member 104 also comprises a material that is inexpensive, may be machined, and/or is resistant to cracking, spalling, and/or other deformation when subjected to repeated cycling at high temperatures.

The size and configuration of the pin 102 and the collar member 104 can be selected based on the desired application. The collar member 104 can comprise an inner diameter defining an inner cavity extending from a first end of the collar member 104 to a second end of the collar member 104. The inner cavity can be sized and configured to receive the pin 102. For example, and without limitation, the pin 102 can be at least partially disposed in the inner cavity, and the collar member 104 and the pin 102 can be secured together by a friction fit. In various non-limiting embodiments, the collar member 104 can comprise an external diameter, $D_1$, in a range of 1 mm to 25 mm, 5 to 25 mm, 5 mm to 20 mm, 10 mm to 25 mm, or 12 mm to 22 mm. For example, the collar member 104 can comprise an external diameter, $D_1$, of 12.5 mm or 16 mm. In various non-limiting embodiments, the pin 102 can comprise an external diameter, $D_2$, in a range of 1 mm to 20 mm, such as, for example, 2 mm to 12 mm or 2 mm to 10 mm. For example, the pin 102 can comprise an external diameter, $D_2$, of 6.4 mm. In various non-limiting embodiments, the inner diameter of the collar member 104 can be sized to receive the external diameter $D_2$ of the pin 102 in order to enable the pin 102 to be introduced into the cavity along a longitudinal axis, $A_1$, of the collar member 104. In certain non-limiting embodiments, the inner diameter can be sized and configured to enable a friction fit between the pin 102 and the collar member 104. In certain non-limiting embodiments, the pin 102 and the collar member 104 can be brazed together.

In various non-limiting embodiments, the collar member 104 can comprise a length, l, extending along the longitudinal axis, $A_1$, in a range of 0.1 mm to 10 mm or 0.5 mm to 5 mm. For example, the collar member 104 can comprise a length, l, of 2 mm. The length can be measured from the base 102b of the pin 102 to a surface 104a of the collar member 104. In various non-limiting embodiments, the collar member 104 can extend further down the hybrid electrode 100 so electrode dressing can be employed on the pin 102.

The pin 102 can comprise a surface 102a, and the collar member 104 can comprise the surface 104a. The surface 102a can be disposed away from the collar member 104 such that during the fastening operation the surface 102a extends beyond the surface 104a and can contact a portion of an assembly before the collar member 104 contacts the assembly. For example, and without limitation, the surface 102a can be offset from the surface 104a along the longitudinal axis, $A_1$, by a distance, $d_1$, of at least 0.1 mm, such as, for example, at least 0.2 mm, at least 0.5 mm, or at least 1 mm. In various non-limiting embodiments, the surface 102a can be offset from the surface 104a along the longitudinal axis, $A^1$, by the distance, $d_1$, in a range of 0.1 mm to 5 mm or 0.5 mm to 1 mm. Thus, in various non-limiting embodiments, the hybrid electrode 100 can penetrate the assembly a distance, $d^1$, prior to the surface 104a contacting the assembly.

Figure 4:
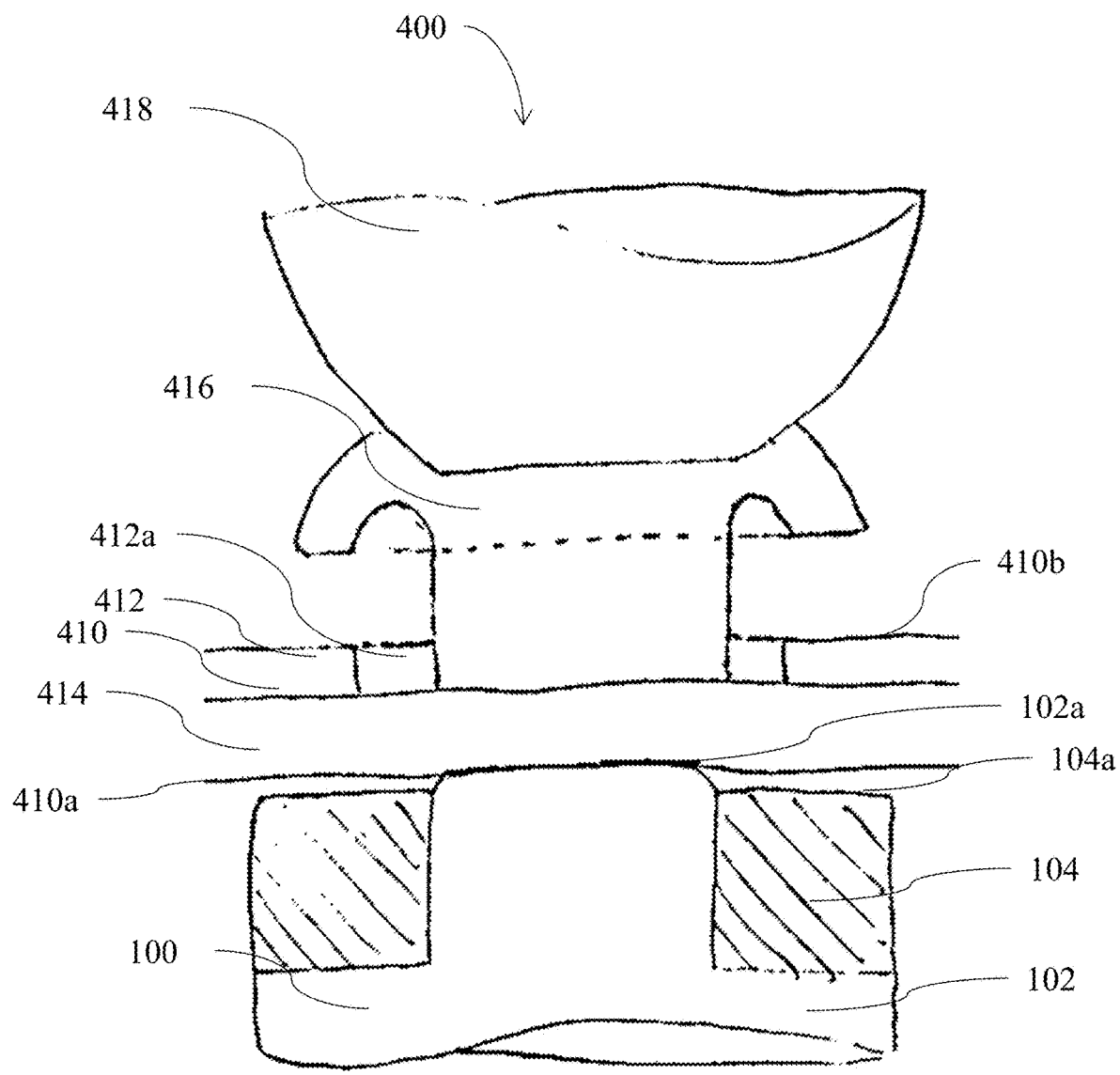
FIG. 4 is a cross-sectional side view of a hybrid electrode according to the present disclosure and a second electrode contacting an assembly.

Referring to FIG. 4, a portion of a resistance spot rivet welding apparatus 400 is shown. The resistance spot rivet welding apparatus 400 comprises two electrodes, including the hybrid electrode 100 and a second electrode 418 contacting a metallic rivet 416 and an assembly 410. The metallic rivet 416 and the assembly 410 are interposed between the hybrid electrode 100 and the second electrode 418. The assembly 410 can comprise a metal, a metal alloy, a composite, or a combination thereof. As illustrated, the assembly 410 comprises at least two parts or at least three parts, including a first layer 412 and a second layer 414 as shown. The first layer 412 comprises a first material, and the second layer 414 comprises a second material. The first material may be the same as or different from the second material. In certain non-limiting embodiments, the first material differs from the second material. For example, one of the first layer 412 and the second layer 414 can comprise iron or an iron alloy, and the other of the first layer 412 and the second layer 414 can comprise aluminum or an aluminum alloy. The rivet 416 can comprise a metal and/or a metal alloy, such as, for example, iron, an iron alloy, aluminum, and/or an aluminum alloy.

In various non-limiting embodiments, the first layer 412 may comprise a pilot hole 412a such that the metallic rivet 416 can contact the second layer 414 prior to a resistance welding operation. In certain non-limiting embodiments, the first layer 412 does not comprise a pilot hole 412a. In various non-limiting embodiments, the first layer 412 may comprise an iron alloy, the second layer 414 may comprise aluminum and/or an aluminum alloy, and the rivet 416 may comprise aluminum and/or an aluminum alloy. In certain non-limiting embodiments, the first layer 412 may comprise aluminum and/or an aluminum alloy, the second layer 414 may comprise an iron alloy, and the rivet 416 may comprise an iron alloy.

Figure 5:
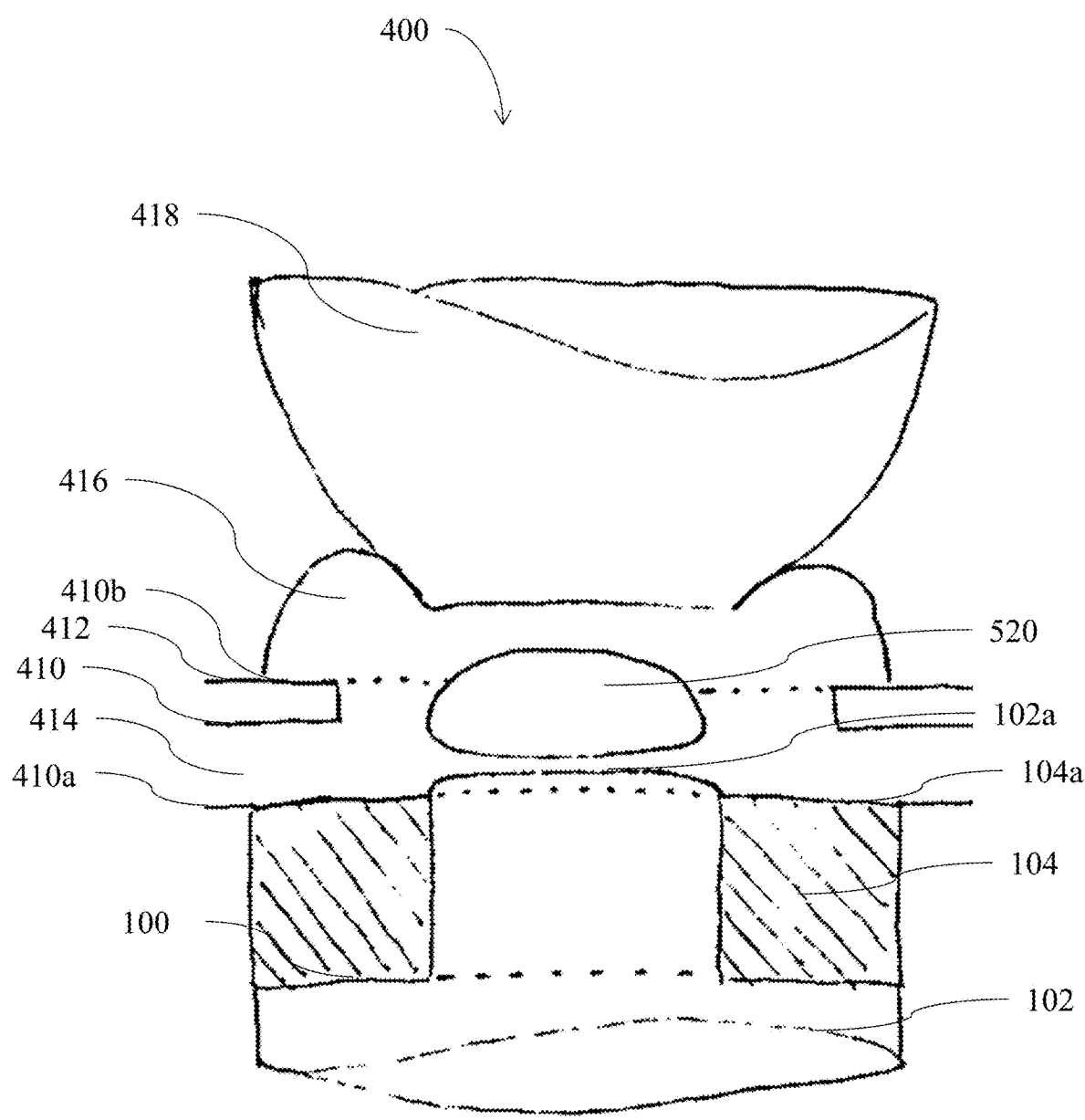
FIG. 5 is a cross-sectional side view of the hybrid electrode disclosure, the second electrode, and the assembly of FIG. 4 after a resistance welding operation.

The offset of the surface 102a from the surface 104a can result in favorable current transfer from the hybrid electrode 100 to the assembly 410 during the initial part of the welding operation. For example, the surface 104a contacts a portion of the assembly 410 before the collar member 104 contacts the assembly 410. Thereafter, a resistance welding operation is applied to the assembly 410 including passing between the hybrid electrode 100 and the second electrode 418, through the assembly 410 and the metallic rivet 416, thereby forming a weld 520 securing together the at least two parts of the assembly 410, as illustrated in FIG. 5. As the pin 102 penetrates the assembly 410 during the resistance welding operation, the collar member 104 subsequently contacts the assembly 410. The higher electrical resistance of the collar member 104 can minimize the change in current density even though a greater surface area of the hybrid electrode 100 is contacting the assembly 410 than was present prior to the collar member 104 contacting the assembly 410. The collar member 104 also can limit additional penetration of the hybrid electrode 100 into the assembly 410. Therefore, since the penetration of the hybrid electrode 100 through a first side 410a of the assembly 410 can be limited by the collar member 104, the rivet 416 disposed on a second side 410b of the assembly 410 opposite the hybrid electrode 100 can have greater movement through the assembly 410 than if the penetration of the hybrid electrode 100 was not limited. Limiting penetration of the hybrid electrode 100 can prevent excessive indentation on the assembly 410 by the hybrid electrode 100 and limit expulsion of material from the weld 520. In addition, once the assembly 410 contacts the collar member 104, the thermal conductivity of the joint can be changed comparative to an all copper electrode which can lead to a higher heat density since the heat transfer away from weld 520 can be minimized.

In various non-limiting embodiments, the assembly 410 can be configured as an aerospace component or structure, an automotive component or structure, a transportation component or structure, a building and construction component or structure, or another component or structure.

Figure 2A:
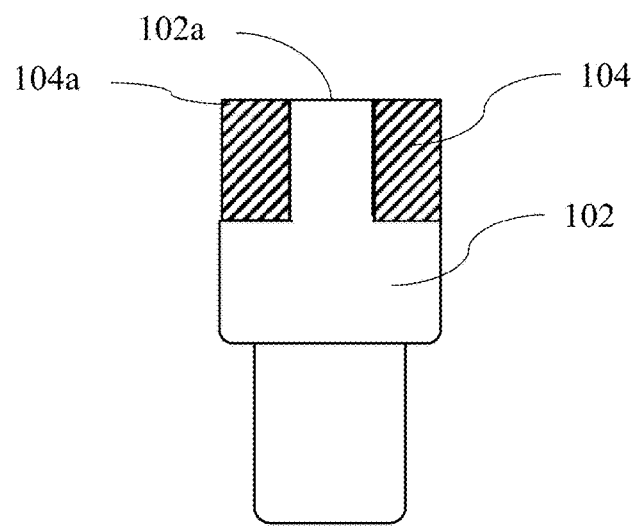
FIG. 2A is a cross-sectional side view of a non-limiting embodiment of a hybrid electrode according to the present disclosure.
Figure 2B:
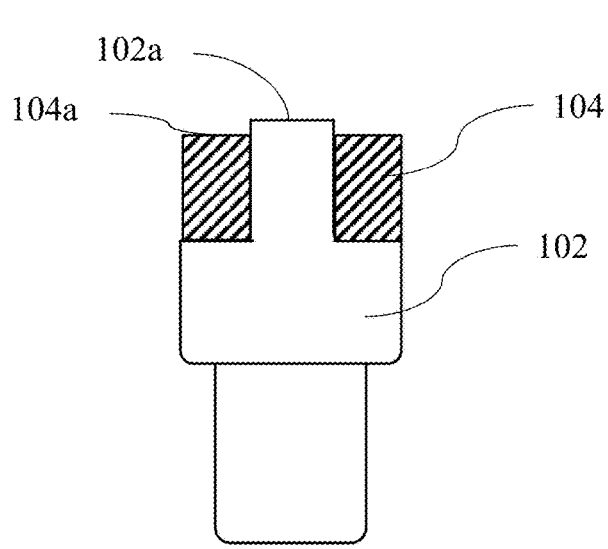
FIG. 2B is a cross-sectional side view of the hybrid electrode of FIG. 2A after machining the collar member.
Figure 2C:
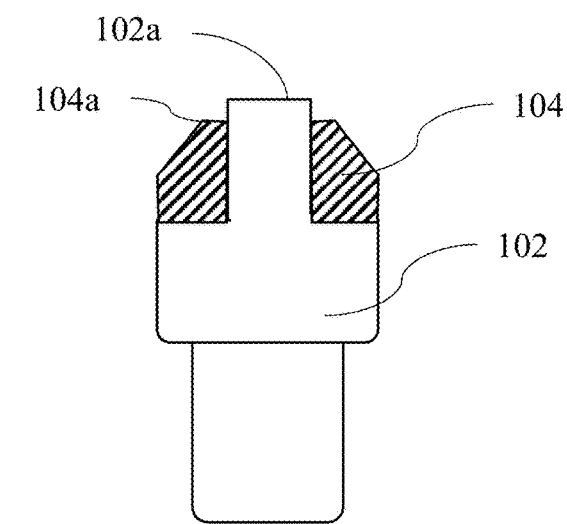
FIG. 2C is a cross-sectional side view a cross-section of the hybrid electrode of FIG. 2A after machining of the collar member.

Referring to FIG. 2A, the hybrid electrode 100 can be manufactured with a pin 102 having a surface 102a that is substantially parallel to surface 104a of the collar member 104. Thereafter, referring to FIG. 2B or FIG. 2C, the hybrid electrode 100 can be machined (e.g., via an electrode dresser) to a desired geometry and achieve the desired offset between the surface 102a and the surface 104a.

Figure 3:
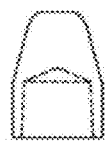
FIG. 3 is a schematic illustration showing various shapes for non-limiting embodiment of hybrid electrodes according to the present disclosure.
Figure 3:
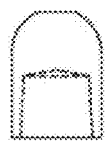
Figure 3:
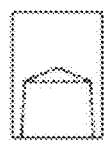
Figure 3:
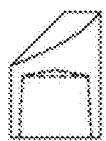
Figure 3:
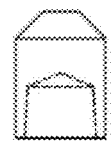
Figure 3:
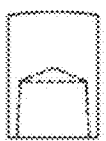
Figure 3:
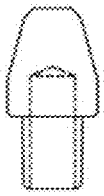
Figure 3:
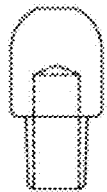
Figure 3:
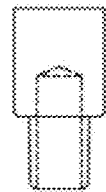
Figure 3:
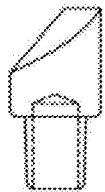
Figure 3:
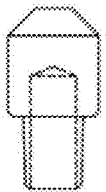
Figure 3:
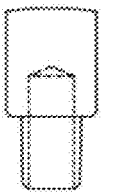

Referring to FIG. 3, the hybrid electrode 100 can be various electrode types, such as, for example, A nose, B nose, C nose, D nose, E nose, or F nose. The hybrid electrode 100 can be a male electrode or a female electrode.

EXAMPLES

The present disclosure will be more fully understood by reference to the following examples, which provide illustrative non-limiting aspects of the invention. It is understood that the invention described in this specification is not necessarily limited to the examples described in this section.

A resistance spot rivet welding apparatus was assembled. The top electrode that contacts the metallic rivet was constant throughout the experiments. The bottom electrode was either a conventional 6.4 mm B-nose electrode or a hybrid electrode. The hybrid electrode used in the experiments was configured according to non-limiting embodiment shown in FIG. 1 and included a collar having a 12.5 mm diameter and 2 mm length that was press fit onto a 6.4 mm pin machined from a standard 16 mm F-nose electrode. The pin was offset from the top of the steel ring by a distance in a range of 0.5 mm to 1.0 mm. The collar comprised steel and the pin comprised copper.

Example 1

Figure 6A:
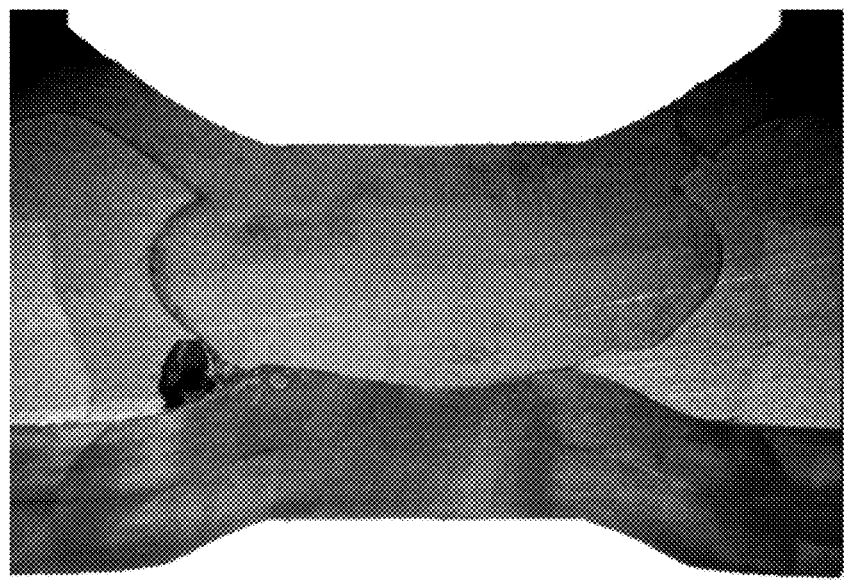
FIG. 6A is an image of a cross-section of a weld with a conventional electrode.

A three-layer assembly and a steel rivet were contacted with the conventional electrode and the top electrode. The three-layer assembly comprised a top layer of aluminum, an intermediate layer of steel, and a bottom layer of steel. The conventional electrode contacted the bottom layer of steel, and a resistance welding operation was performed. The results of the welding operation are shown in FIG. 6A.

Figure 6B:
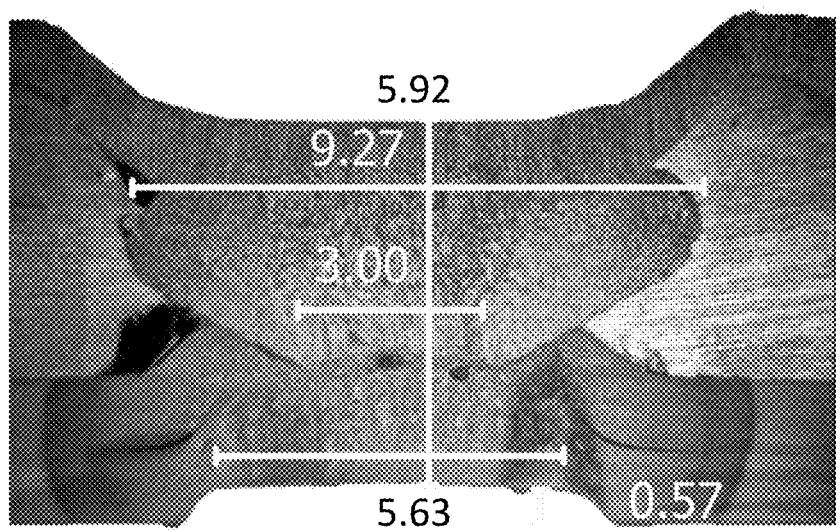
FIG. 6B is an image of a cross-section of a weld with a hybrid electrode according to the present disclosure (dimensions are shown in millimeters)

As a comparison, the three-layer assembly and a steel rivet were contacted with the hybrid electrode and the top electrode. The hybrid electrode contacted the bottom layer of steel, and a resistance welding operation was performed. The results of the welding operation are shown in FIG. 6B. It was observed that the amount of contact on the bottom layer of steel was much lower with the hybrid electrode than with the conventional electrode, and the heat balance was tailored with the hybrid electrode to drive welding between the intermediate layer of steel and the bottom layer of steel.

Example 2

Figure 8A:
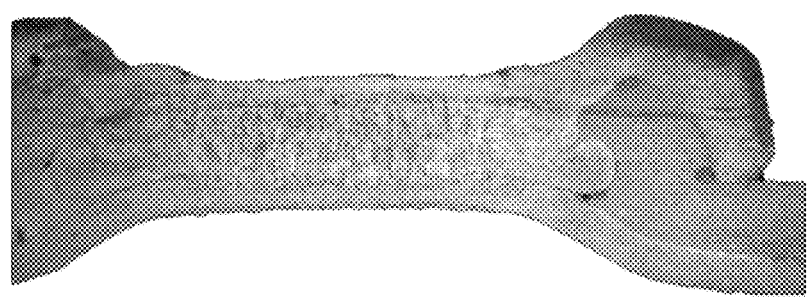
FIG. 8A is an image of a cross-section of a weld with a conventional electrode.
Figure 8B:
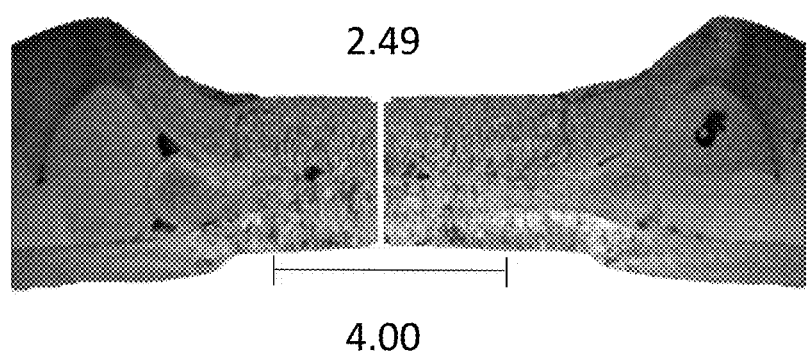
FIG. 8B is an image of a cross-section of a weld with a hybrid electrode according to the present disclosure (dimensions are shown in millimeters).

A three-layer assembly and a steel rivet were contacted with the conventional electrode and the top electrode. The three-layer assembly comprised a top layer of aluminum and a bottom layer of steel. The conventional electrode contacted the bottom layer of steel, and a resistance spot rivet welding operation was performed. The results of the welding operation are shown in FIG. 8B.

Figure 7A:
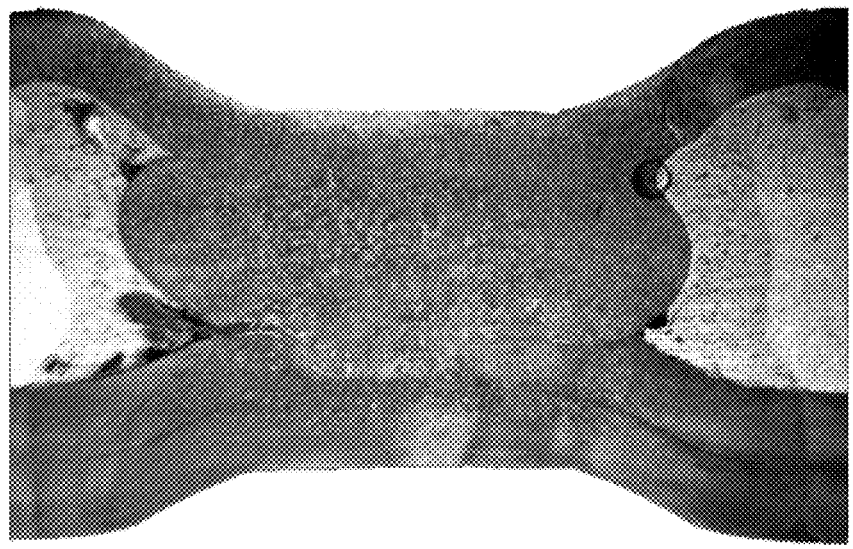
FIG. 7A is an image of a cross-section of a weld with a conventional electrode.
Figure 7B:
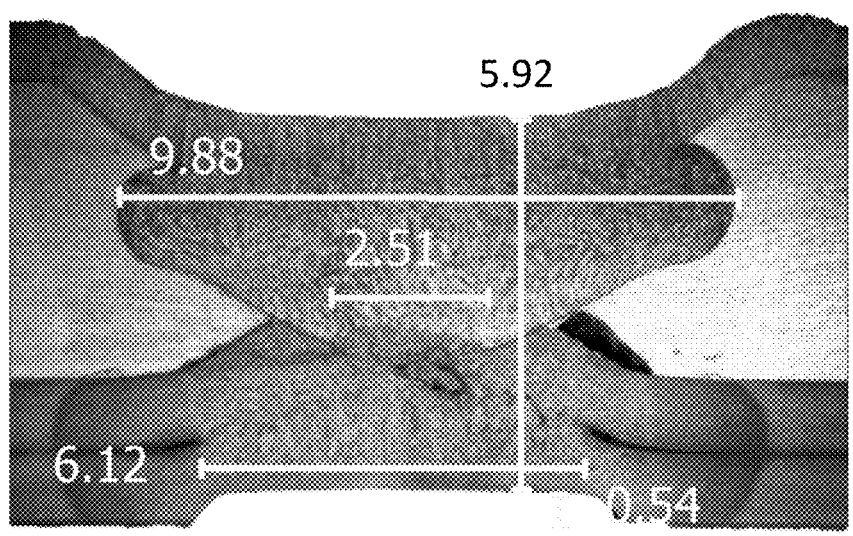
FIG. 7B is an image of a cross-section of a weld with a hybrid electrode according to the present disclosure (dimensions are shown in millimeters)

As a comparison, the three-layer assembly including adhesive and a steel rivet were contacted with the hybrid electrode and the top electrode. The hybrid electrode contacted the bottom layer of steel, and a resistance welding operation was performed. The results of the welding operation are shown in FIG. 7B. It was observed that the amount of contact on the bottom layer of steel was much lower with the hybrid electrode than with the conventional electrode, and the heat balance was tailored with the hybrid electrode to drive welding between the intermediate layer of steel and the bottom layer of steel.

Example 3

A two-layer assembly and a steel rivet were contacted with the conventional electrode and the top electrode. The two-layer assembly comprised a top layer of aluminum, an intermediate layer of steel, and a bottom layer of steel. Adhesive was present between the top layer of aluminum and the intermediate layer of steel. The conventional electrode contacted the bottom layer of steel, and a resistance spot rivet welding operation was performed. The results of the welding operation are shown in FIG. 7B.

As a comparison, the two-layer assembly and a steel rivet were contacted with the hybrid electrode and the top electrode. The hybrid electrode contacted the bottom layer of steel, and a resistance welding operation was performed. The results of the welding operation are shown in FIG. 8B. It was observed that the amount of contact on the bottom layer of steel was much lower with the hybrid electrode than with the conventional electrode, and the heat balance was tailored with the hybrid electrode to drive welding between the intermediate layer of steel and the bottom layer of steel. It was also observed that there was a deep weld penetration into the bottom layer of steel.

Whereas particular examples of this invention have been described above for purposes of illustration, it will be evident to those skilled in the art that numerous variations of the details of the present invention may be made without departing from the invention as defined in the appended claims.

One skilled in the art will recognize that the herein described hybrid electrodes, systems, structures, methods, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A hybrid electrode for resistance spot welding, the hybrid electrode comprising:
   a pin comprising an electrically conductive material, the pin comprising a pin contact surface and a base; and
   a collar member comprising a material that is at least one of less electrically conductive than the electrically conductive material of the pin and less thermally conductive than the electrically conductive material of the pin, wherein the collar member comprises a first collar end, a second collar end, a collar member contact surface and defines an inner cavity and a longitudinal axis, wherein the inner cavity extends from the first collar end to the second collar end;

wherein the pin extends through the inner cavity and the pin contact surface extends away from the collar member and is offset a distance along the longitudinal axis from the collar member contact surface, and wherein the collar member is intermediate the base and the pin contact surface; and wherein the collar member is configured to directly contact a surface of an assembly contacted by the pin to limit a penetration depth of the hybrid electrode into the assembly during a resistance spot welding operation;

wherein the pin contact surface is configured to directly contact the assembly during a resistance spot welding operation;

wherein the material of the collar member comprises at least one of copper, a copper alloy, iron, an iron alloy, titanium, and a titanium alloy.

2. The hybrid electrode of claim 1, wherein the collar member is less electrically conductive than the electrically conductive material of the pin.

3. The hybrid electrode of claim 1, wherein the collar member is less thermally conductive than the electrically conductive material of the pin.

4. The hybrid electrode of claim 1, wherein the pin comprises at least one of copper and a copper alloy.

5. The hybrid electrode of claim 1, wherein the pin and the collar member are secured together by a friction fit, a braze, or a combination thereof.

6. The hybrid electrode of claim 1, wherein the collar member comprises an external diameter in a range of 5 mm to 25 mm and the pin comprises an external diameter in a range of 1 mm to 20 mm.

7. The hybrid electrode of claim 1, wherein the collar member comprises an external diameter in a range of 12 mm to 22 mm and the pin comprises an external diameter in a range of 2 mm to 10 mm.

8. The hybrid electrode of claim 1, wherein the collar member comprises a length in a range of 0.1 mm to 10 mm.

9. The hybrid electrode of claim 1, wherein the pin is offset from the collar member contact surface in a range of 0.1 mm to 5 mm along the longitudinal axis.

10. The hybrid electrode of claim 1, wherein the pin is offset from the collar member contact surface in a range of 0.5 mm to 1 mm along the longitudinal axis.

11. A resistance spot rivet welding apparatus comprising the hybrid electrode of claim 1.

12. A method of resistance spot welding, the method comprising:

contacting a metallic rivet and an assembly comprising at least two parts and a metallic rivet with the hybrid electrode of claim 1 and a second electrode, wherein the metallic rivet and the assembly are interposed between the hybrid electrode and the second electrode; and passing a weld current between the hybrid electrode and the second electrode, through the assembly and the metallic rivet, thereby forming a weld securing together the at least two parts of the assembly.

13. The method of claim 12, wherein a first part of the least two parts of the assembly comprises a first material and a second part of the least two parts comprises a second material, and wherein the first material differs from the second material.

14. The method of claim 13, wherein the first material comprises at least one of aluminum and an aluminum alloy and the second material comprises at least one of iron and an iron alloy.

15. The method of claim 12, wherein during the passing a weld current between the hybrid electrode and the second electrode, through the assembly and the metallic rivet, the collar member engages the assembly to limit a penetration depth of the hybrid electrode into the assembly.

16. The method of claim 12, wherein during the passing a weld current between the hybrid electrode and the second electrode, through the assembly and the metallic rivet, the metallic rivet is intermediate the second electrode and the assembly.

17. The hybrid electrode of claim 1, wherein the pin contact surface is substantially parallel to the collar member contact surface.

* * * * *